Feb. 20, 1951 — R. M. FLANAGAN — 2,542,863
CONTROL MECHANISM
Filed Jan 9, 1945

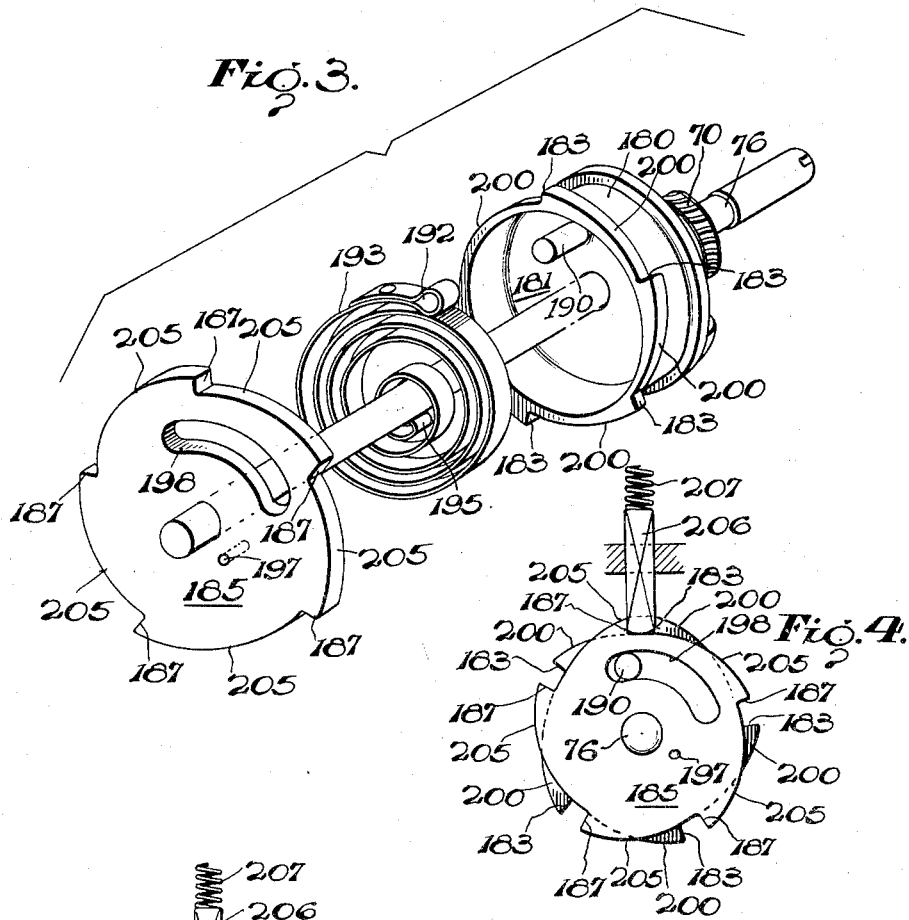

Inventor
Robert M. Flanagan
By Herbert L. Davis, Jr.
Attorney

Inventor
Robert M. Flanagan
By Herbert L. Davis, Jr.
Attorney

Patented Feb. 20, 1951

2,542,863

UNITED STATES PATENT OFFICE 2,542,863

CONTROL MECHANISM

Robert Michael Flanagan, Glen Rock, N. J., assignor to Bendix Aviation Corporation, Teterboro, N. J., a corporation of Delaware Application January 9, 1945, Serial No. 572,017

9 Claims. (Cl. 244—134)

The present invention relates to improved mechanism for operating inflatable elements of the type mounted on airfoil surfaces of an aircraft for eliminating and preventing the accumulation of ice on such surfaces.

More particularly the present invention relates to a novel compact assemblage of operating mechanism for controlling the inflation and deflation of such ice eliminating elements or inflatable boots.

An object of the present invention is to provide in a single housing a novel compact assemblage of operating parts including a pump, a snap action distributor valve, timing mechanism for controlling the intervals of inflation of the ice eliminating elements and a motor means for driving the aforenoted operating mechanism.

Another object of the invention is to provide a novel snap action escapement mechanism for controlling the operation of the distributor mechanism.

Another object of the invention is to provide a novel compact distributor valve mechanism for controlling the inflation and deflation of the inflatable elements.

Another object of the invention is to provide a novel escapement mechanism for controlling the operation of the distributor, including novel means for stopping the distributor valve at a predetermined position.

Another object of the invention is to provide a novel spring wound snap action distributor valve actuating mechanism, including novel safety means so arranged that in the event of breakage of the actuating spring, continued operation of the distributor valve may be effected.

Another object of the invention is to provide a novel air pump arrangement, including a novel tubular air filter at the inlet of the pump.

Another object of the invention is to provide at one end of the novel tubular air pump filter an emergency valve arranged so as to open in the event passage of air through the filter becomes obstructed.

Another object of the invention is to provide novel means for mounting the tubular filter at the inlet of the air pump.

Other objects will appear from a study of the following specification when made in conjunction with the attached drawings, throughout which, like numerals designate like parts.

Figure 3 is an exploded perspective view of the snap action spring actuating mechanism.

Figure 4 is an end view of the mechanism of Figure 3 and showing the same in operating relation.

Figure 5 is a side view of Figure 4.

Figure 1:
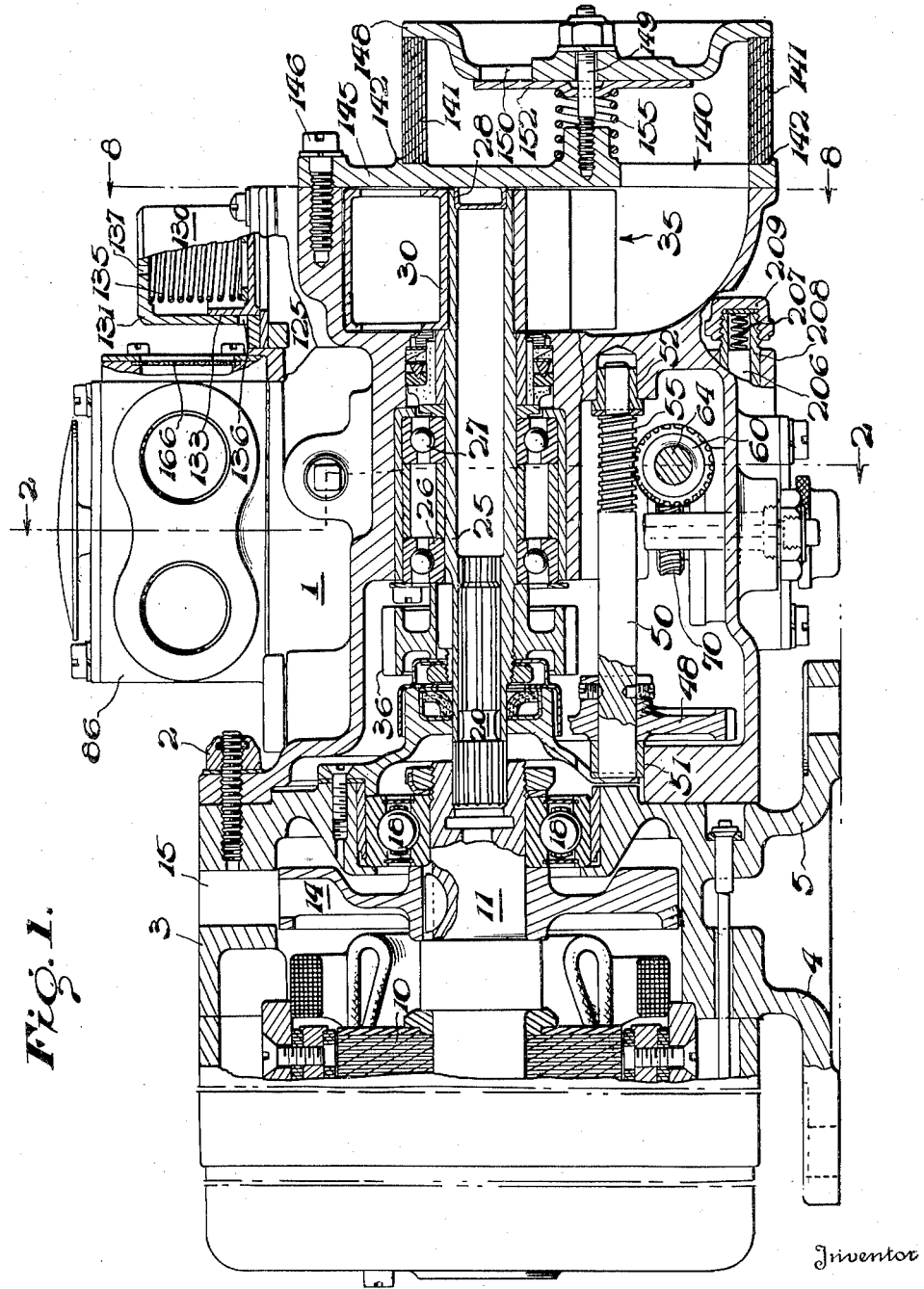
Figure 1 is a longitudinal sectional view of the operating mechanism taken along the lines 1—1 of Figure 2 and with certain parts broken away to better illustrate the operating mechanism.

Referring to the drawing of Figure 1, there is provided a main casting or housing 1 to which there is fastened at one end by a suitable fastening member 2 a second casting or motor housing 3. The housing 3 has affixed thereto the supporting or mounting brackets 4 and 5. Carried within the housing 3 is a suitable electric motor 10 which may be conventional in type and arranged to drive a shaft 11. The shaft 11 has keyed thereto an impeller element 14 for drawing air for cooling the motor 10 through suitable openings, not shown, formed in the end of the casting 3 and out an opening 15 formed in the side of the casting 3.

The shaft 11 is supported at one end by ball bearings 18, while at the opposite end similar ball bearings, not shown, are provided.

The shaft 11 is connected at one end through a floating spline coupling 20 at one end of a shaft 25 rotatably supported in the housing 1 by ball bearings 26 and 27. The shaft 25 has affixed at the opposite end one impeller element 30 of a Roots type blower, indicated generally by the numeral 35 and best shown in Figure 8. The end of the shaft 25 is closed by a suitable closure member 28.

Figure 2:
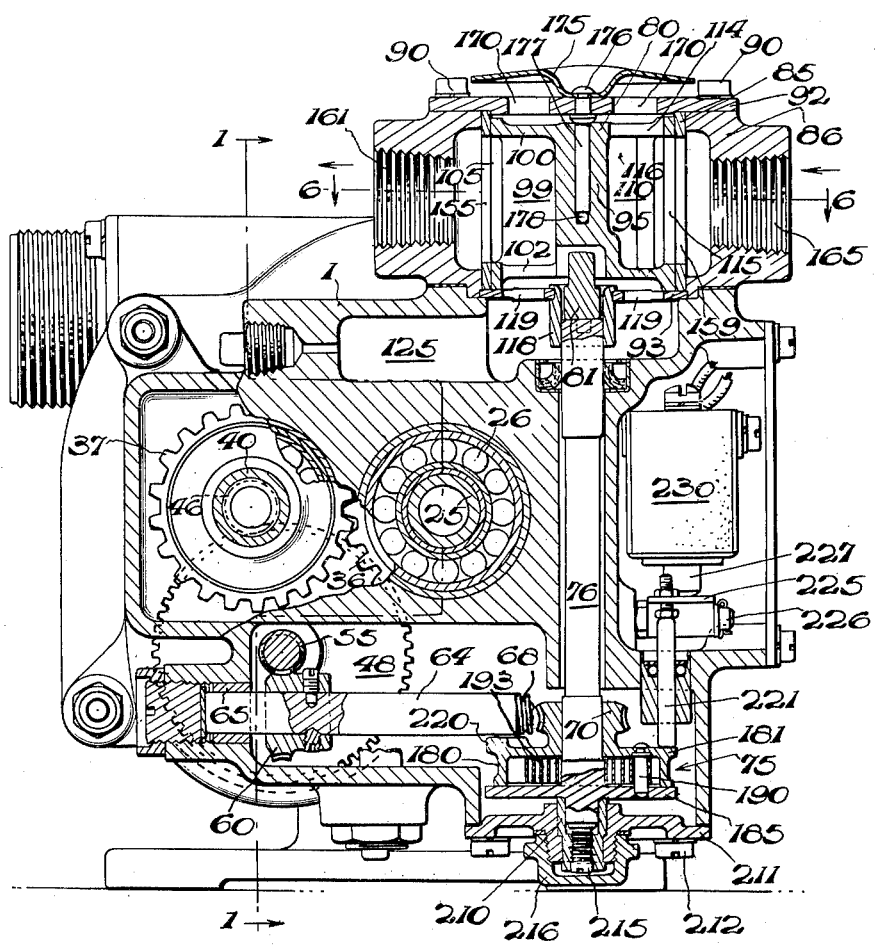
Figure 2 is a sectional view taken along the lines 2—2 of Figure 1 and with certain parts broken away to better illustrate the operating mechanism.
Figure 7:
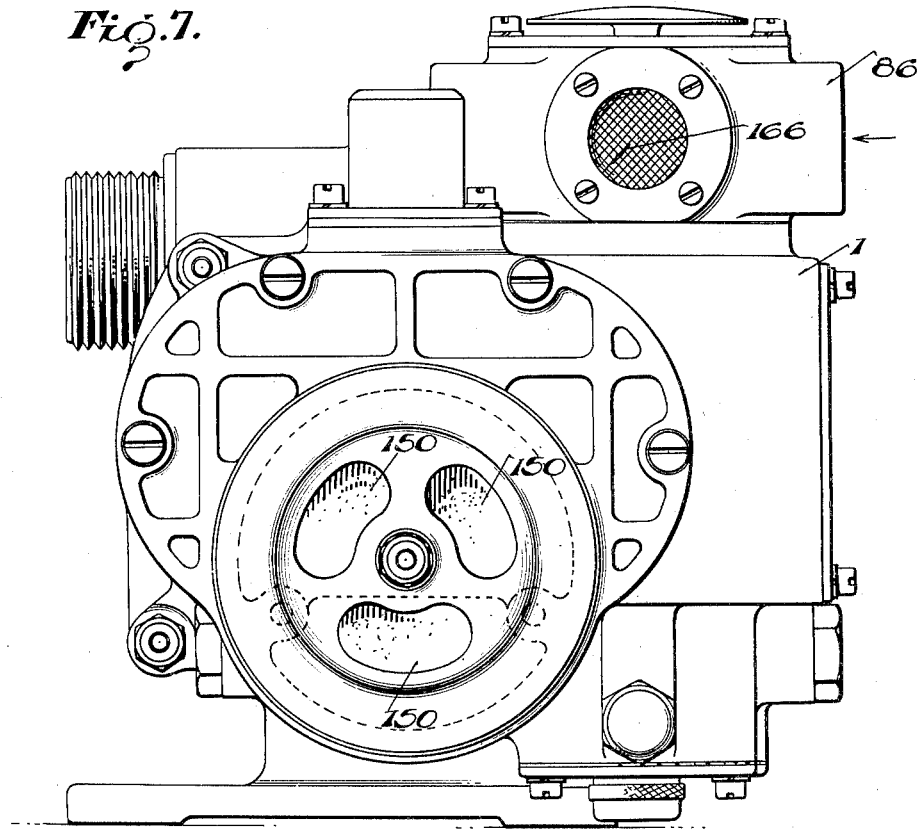
Figure 7 is an end view of Figure 1 illustrating the pump mechanism.

Keyed to the shaft 25 is a gear 36 driving a second gear 37 as shown in Figure 2. The gear 37 is keyed to a second shaft 40 which is rotatably supported in the casting by ball bearings, not shown, but which may be similar to the bearings 26 and 27 supporting shaft 25.

At one end of the shaft 40 there is affixed another impeller element 45 of the Roots type blower 35. The latter end of the shaft 40 is closed by a suitable closure member 41.

At the opposite end of the shaft 40 there is affixed a spur gear 46 indicated in Figure 2 by dotted lines. The spur gear 46 drivingly connects the shaft 40 to a second gear 48 intermeshing with the gear 46. The gear 48 is affixed to a shaft 50 supported at opposite ends by suitable bearing members 51 and 52 in the housing 1, as shown in Figure 1.

The shaft 50 has a helical or worm gear 55 engaging the teeth of a gear 60 affixed to a shaft 64. The shaft 64 is rotatably mounted in suitable bearing members carried by the housing 1 and one of which is shown in Figure 2 at 65.

The shaft 64 has a suitable helical or worm gear 68 which in Figure 2, is shown broken away so as to better illustrate the operating mechanism.

Operably connected to the worm gear 68 is a gear 70 which is connected to a snap action spring actuating escapement mechanism indicated generally by the numeral 75. The latter mechanism is described and claimed in the copending divisional application Serial No. 717,838 filed December 23, 1946, and now U. S. Patent No. 2,460,000, granted January 25, 1949, and assigned to Bendix Aviation Corporation.

The latter mechanism effects the actuation of a shaft 76 with a snap action, as will be explained hereinafter, so as to adjustably position a cylindrical air distributor valve 80 which is connected thereto through a floating spline 81.

Figure 6:
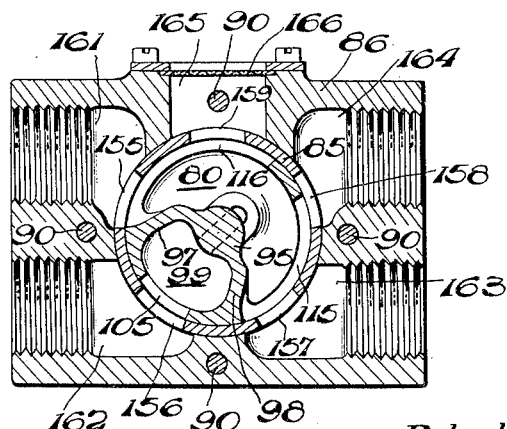
Figure 6 is a sectional view of the distributor mechanism taken along the lines 6—6 of Figure 2.

The distributor valve 80, as shown in Figure 6, is rotatably mounted in a sleeve 85 positioned within a housing 86. The housing 86 is affixed to the main housing 1 by suitable bolts 90 which also serve to fasten to the housing 86 a top plate 92 positioned at the upper end of the rotatable distributor valve 80. At the opposite or lower end of the distributor valve 80, as shown in Figure 2, there is provided a plate 93.

Figures 9, 10:
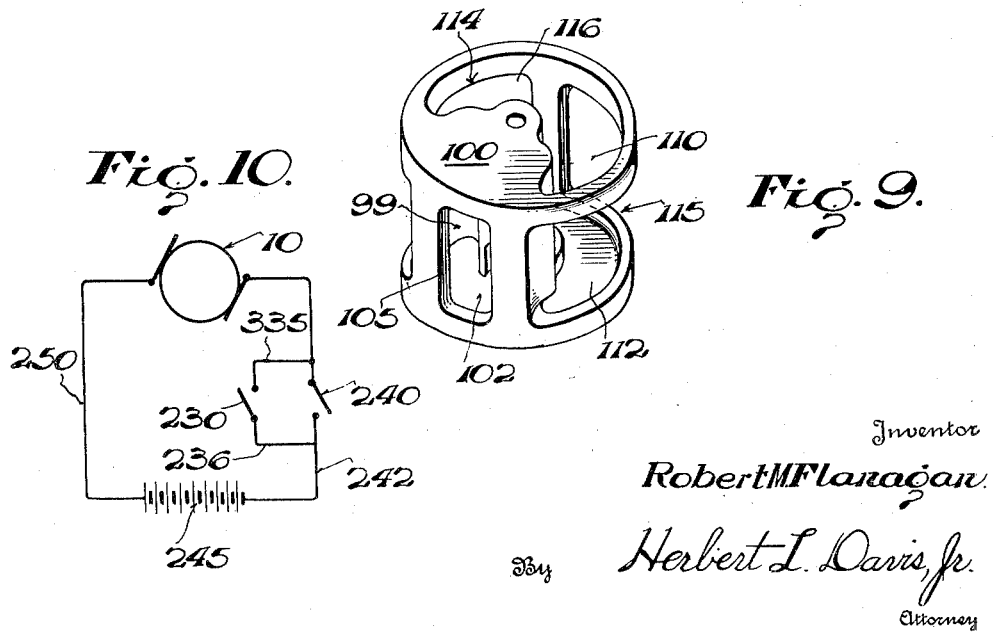
Figure 9 is a perspective view of the distributor valve.
Figure 10 is a diagrammatic view of the energizing circuit for the driving motor of the mechanism and illustrating the operation of the limit switch.

The valve 80, as shown in Figures 6 and 9, has provided a stem 95 from which radially projects wall portions 97 and 98 forming a segmental chamber 99 which is closed at the upper end, as viewed in Figures 2 and 9, by a wall 100 and open at the lower end by a port 102. The valve 80 has a port 105 opening through the cylindrical wall of the valve 80 into the chamber 99. Separated by the wall portions 97 and 98 from the chamber 99, is a second chamber 110 which is closed at the lower end by a wall portion 112 and open at the upper end by a port 114. Ports 116 and 115 open through the cylindrical wall of the valve 80 into the chamber 110.

A sleeve 118 projects through the plate 93 and is fixedly mounted thereto. The shaft 76 is rotatably mounted at one end in the sleeve 118 and is drivingly connected to the valve 80 through means of the floating spline 81 as previously explained.

Figure 8:
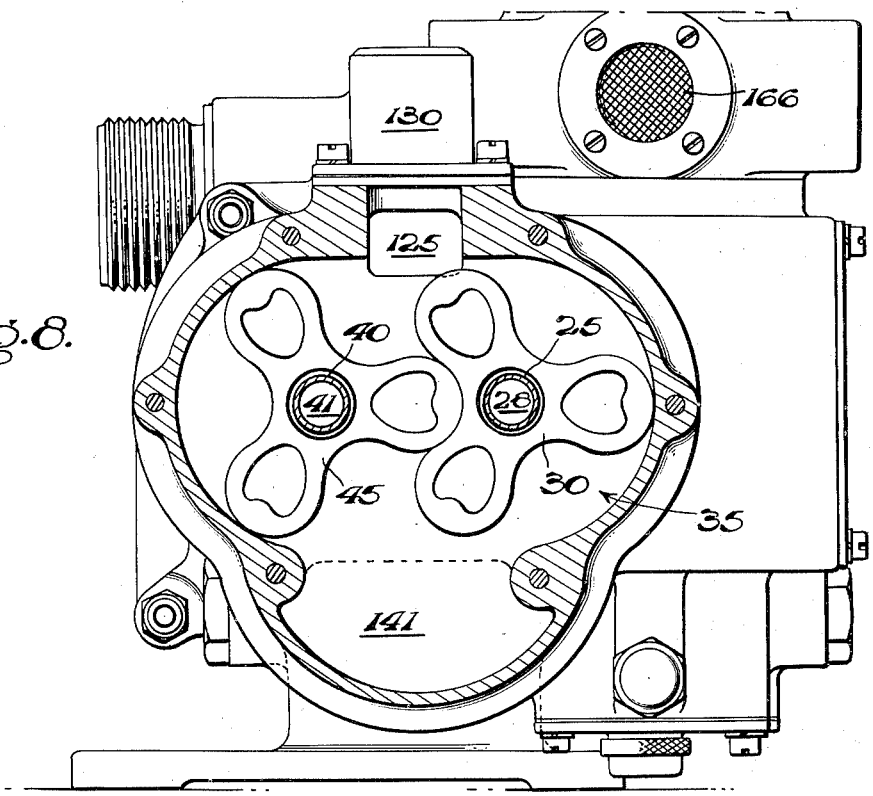
Figure 8 is a view of the pump mechanism taken along the lines 8—8 of Figure 1.

Openings 119 are provided in the plate and lead from the opening 102 in the valve 80 into a passage 125 formed in the casting 1 and leading into the chamber of the Roots type blower or air pump 35, as shown in Figures 1, 2 and 8.

Intermediate the opposite ends of the passage 125 there is provided a pressure regulating valve 130 including a valve cap 131, a sleeve type valve 133, biased under the force of the spring 135 into a position closing the air outlet port 136 controlled by the sleeve valve 133. The sleeve valve 133 is biased by the air pressure in the passage 125 at one end of the valve 133 against the force of the spring 135. Atmospheric pressure is applied to the valve 133 at the other side through a port 137. Thus the valve 133 is biased by the pressure in the passage 125 so as to open the port 136 for decreasing the air pressure in the passage 125. The valve 130 is arranged to maintain the air pressure for operating the inflatable boot elements within a predetermined differential pressure range.

Air passes into the pump 35 through an air inlet 140 which opens from a tubular filter 141 formed of a suitable fibrous material. The air is drawn through the tubular filter 141 into the pump 35.

One end of the tubular filter 141 is positioned in a suitable seat 142 formed in an end plate 145 of the pump 35. The end plate 145 is fastened to the casting 1 by bolts 146. The opposite end of the tubular filter 141 is held by a plate 148 secured in position by a center bolt 149 screw threadedly engaged in the end plate 145. Valve openings 150 are provided in the end plate 148. The latter valve openings 150 are controlled by a flap valve 152 slidably mounted on the center bolts 149, and biased in a direction for normally closing the valve openings 150 by a spring 155 positioned between the end plate 145 and the flap valve 152. At such times as the tubular filter 141 may become obstructed to the passage of air, the valve 152 will be drawn open so as to permit the passage of air to the pump 35 through the openings 150.

It will be thus seen that air will be drawn by the pump 35 through the opening 140 and forced under pressure of the pump 35 into the passage 125 leading to the valve 80.

The foregoing pump and filter mechanism are shown and claimed in the copending divisional application Serial No. 717,837, filed December 23, 1946.

As shown in Figure 6, the valve 80 is rotatably mounted within the sleeve 85 which has provided therein ports 155, 156, 157, 158 and 159 opening into passages 161, 162, 163, 164 and 165, respectively, formed in the casting 86. The passages 161, 162, 163 and 164 are connected by suitable air pressure conduits to inflatable elements, not shown, mounted on airfoil surfaces of an aircraft for eliminating ice therefrom, while the passage 165 opens to the atmosphere through a suitable screen 166 fastened at the outer side of the casting 86.

The valve 80 is actuated with a snap action, as will be explained hereinafter, so that the port 105 successively registers with the ports 155, 156, 157, 158 and 159. Thus the passages 161, 162, 163, 164 and 165 are successively connected with the air pressure in the passage 125. The respective inflatable elements or boots operably connected to the passages 161, 162, 163 and 164 are successively inflated. The passage 165 which opens to the atmosphere provides a necessary time delay between cycles of operation of the inflatable elements and also provides means for periodically exhausting the air from the passage 125 to the atmosphere so as to effect cooling of the unit, and also serves as the home position for the valve when not in operation so that all the boots of the ice eliminating system may be completely deflated at such time.

It will be further noted that as the valve 80 is actuated by the shaft 76 in a counterclockwise direction, as viewed in Figure 6, the port 105 is successively moved out of registration with the ports 155, 156, 157 and 158 and such ports are successively opened to the atmosphere by port 116 as the port 105 is moved out of registration with such ports. Thus the inflatable elements are inflated upon the port 105 registering with the corresponding ports 155, 156, 157 and 158 and deflated upon the port 116 registering with such ports.

The port 116 opens into chamber 110 of the valve 80. The chamber 110 has a port 114 at the upper end of the valve 80 through which the exhaust air passes from the inflated boot and out ports 170 formed in the end plate 92. A deflector plate 175 is mounted at the exterior of the plate 92 and fastened to the plate 175 by a rivet 176 having an inner end stem portion 177 upon which the valve 80 freely rotates. The end of the stem 177 rests upon an antifriction ball bearing 178. The latter stem 177 and ball bearing 178 arrangement serves to prevent side and end air pressures from causing adverse frictional effects between the valve 80 and the sleeve 85, and the top plate 92.

It will be seen that through the valve 80 the inflatable elements may be successively inflated and deflated. The port 105 of the valve 80 being actuated with a snap action into registering relation from one of the ports in the sleeve 85 to the next succeeding port. The foregoing distributor valve mechanism is described and claimed in the copending divisional application Serial No. 717,839, filed December 23, 1946.

The snap action operation of the valve 80 is effected through the operation of the novel escapement mechanism 75, shown in Figure 2, and in detail in Figures 3, 4 and 5.

The escapement mechanism 75 has a worm gear 70 driven by shaft 64 from the electric motor 10 as previously described. The gear 70 is freely mounted on the shaft 76 and has affixed thereto a cup shaped member 180 having an end plate 181. The member 180 has formed around the circumferential edge thereof radially projecting escapement cam teeth 183.

As shown in Figure 3, the shaft 76 projects through the cup shaped member 180 and has formed thereon a cam member 185. Radially projecting from the cam member 185 are cam teeth 187 formed around the circumferential edge of the member 185, which cam teeth 187 cooperate with the cam teeth 183, as will be explained hereinafter.

Eccentrically positioned within the cup shaped member 180 and projecting axially from the end plate 181 is a pin 190. The pin 190 is arranged to project through a looped end 192 of a spiral spring 193 positioned within the cup shaped member 180 and about the shaft 76. The opposite end 195 of the spring 193 is fastened by a pin 197 to the cam 185.

A cam slot 198 is formed in the cam 197 and there is disposed in the slot 198 the pin 190. The cam teeth 183 have provided cam surfaces 200 which, as shown in Figures 3 and 4, rise in a counterclockwise direction from the inner end of the preceding cam tooth 183 to the outer end of the succeeding tooth 183.

The cam teeth 187 have similarly provided cam surfaces 205 which rise in a clockwise direction from the inner end of the preceding cam tooth 187 to the outer end of the succeeding tooth 187.

The teeth 183 and 187 carried by the members 180 and 185, respectively are positioned circumferentially in spaced relation so that a pawl 206 may be biased under force of a spring 207 so as to fall successively into the interdental spaces between the teeth 183 and 187, as shown in Figure 4. As shown in Figure 1, the pawl 206 slides in a sleeve 208 at the outer end of which is positioned the spring 207 held in position by a cap 209 screw threadedly engaged on the sleeve 208. The end of the pawl 206 rides along the cam surface 200 as the drive member 180 is rotated in a clockwise direction, as viewed in Figure 3, causing the pawl 206 to move out radially from the driven timer shaft 76. Since the pawl locks the tooth 187 from movement, such rotary movement of the driving member 180 winds up or tightens the spring 193 fastened to the members 180 and 185 through the pins 190 and 197 respectively.

The pawl 206 thus moves out radially from the driven shaft 76 and the pin 190 moves in the slot 198 in a clockwise direction until a point is reached where the pawl 206 is raised by the cam surface 200 above the surface of the engaging tooth 187. At the latter point the pawl 206 permits the tooth 187 to move with a snap action in a clockwise direction under tension of the spring 193. The movement of the member 185 under tension of the spring 193 is limited by the pin 190 in the slot 198. Further rotary movement of the cam member 180 then positions the next succeeding tooth 183 so that the pawl is moved under force of the spring into the interdental space between the next succeeding teeth 183 and 187, respectively.

Such snap action movement of the cam member 185 causes a corresponding snap action rotary movement to the driven shaft 76, which in turn imparts a snap action movement to the rotary valve 95, adjusting the same into the next succeeding position, as previously explained.

As shown in Figure 2, the lower end of the driven shaft 76 rotates in a bearing member 210 carried by a plate 211 secured to the casting 1 by bolts 212. The latter end of the shaft 76 rotates upon a positioning screw 215. A removable cap 216 is screw threadedly mounted on the plate 211 and covers the screw 215.

As shown in Figures 2 and 5, there is mounted on the end plate 181 at the outer side thereof a cam surface 220 which at given position of the driving member 180 actuates a pin 221 operably connected to a lever 225 pivoted at 226 and arranged so as to actuate through a button 227, a switch 230. The detail structure of the switch 230 is not shown, but the same is preferably of a snap acting normally closed type, well known in the art. Thus upon inward actuation of the button 227 upon a predetermined movement of the pin 221 the switch 230 is opened. The switch 230, as shown in Figure 10, is connected by conductors 335 and 336 in shunt relation to a main control switch 240. The switch 240 is connected in an electrical conductor 242 leading from one terminal of a source of electrical energy 245 to an input terminal of the electric motor 10. Another electrical conductor 250 leads from the opposite terminal of the source of electrical energy 245 to the other input terminal of the motor 10.

The switch 230 is so arranged that if the main control switch 240 be opened, the circuit to the motor 10 will be held closed until the driving member 180 reaches a predetermined position at which the cam 220 opens switch 230. The latter position of the cam 220 corresponds to the position of the distributor valve 80 at which the port 105 of the valve 80 coincides with the port 159 so as to open the pressure conduit 125 from the rotary pump 35 to the atmosphere through ports 119, 102, valve channel 99, ports 105, 159, passage 165 and screen 166. Thus upon the opening of the main control switch 240, the motor 10 will continue to run until the distributor valve 80 returns to its home position at which position all of the inflatable boots will be deflated and the air in conduit 125 will be exhausted to the atmosphere and the switch 230 actuated to an open position. Thus deflation of all of the boots is assured upon discontinuance of operation of the motor 10. Of course, if the main control switch 240 be kept closed, the motor 10 will continue to be energized and the cycle of operation of the control mechanism will be repeated.

It will be readily seen from the foregoing that there has been provided novel compact mechanism for operating inflatable elements for removing ice from airfoil surfaces for an aircraft in which mechanism there is provided a motor 10 which drives an inflating pump 35 and a snap action timing mechanism 75 for operating an air distributor valve 80 for controlling the inflation and deflation of the elements. The operating mechanism moreover includes a novel filter means 141 for clearing the pump inlet air of dirt and other objectionable foreign matter before being distributed to the inflatable elements.

Further, there is provided a safety means whereby in the event the actuating spring 93 should break the distributor valve 80 will continue to be rotated through the pin 190 of the driving member 180 engaged in the slot 198 of the driven member 185.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. For use with inflatable units for removing ice from airfoil surfaces of an aircraft; a control mechanism comprising in a unitary mounting, an electric motor means, an air pump, means connecting said electric motor means to said air pump, a valve for selectively distributing air under pressure of the pump to inflatable units, an escapement mechanism including a spring for periodically actuating said valve, means connecting said electric motor means to said escapement mechanism for actuating said valve through said spring, switch means for closing a circuit for energizing said electric motor means so as to effect a predetermined cycle of operation of said valve, and means driven by said electric motor means for actuating said switch means to a position for opening said circuit at a predetermined position of said valve.

2. For use with inflatable units for removing ice from airfoil surfaces of an aircraft; a control mechanism comprising in a unitary mounting, an electric motor means, an air pump, means connecting said electric motor means to said air pump, a valve for selectively distributing air under pressure of the pump to inflatable units, a first element, said electric motor means drivingly connected to said first element, a second element connected to said valve, spring means operably connected between said first and second elements and tensioned by movement of said first element relative to said second element, releasable holding means normally positioned to hold said second element from movement, cam means carried by said first element and operating upon movement of said first element to urge said holding means in a direction for releasing said second element for movement under the tension of said spring, means carried by one of said elements for limiting the movement of said second element under the tension of said spring, and said first element being driven by said electric motor means so as to cause said valve to be periodically actuated by said spring.

3. The structure of claim 2 as set forth and defined therein including switch means for closing a circuit for energizing said motor means to effect a predetermined cycle of operation of the valve, and means operated by said first element for actuating said switch means to a position for opening said circuit at a predetermined position of said valve.

4. The structure of claim 2 as set forth and defined therein in which the air distributor valve includes a housing having a plurality of passages extending laterally therein, a rotary valve having a first and a second valve chamber, said first valve chamber open at one end of said valve to the air under pressure of said pump, said second valve chamber open at the opposite end of said valve to atmosphere, said first and second valve chambers having valve ports opening successively to each of said lateral passages, one of said passages opening to atmosphere and the others of said passages for connection to inflatable units.

5. The structure of claim 3 as set forth and defined therein in which the air distributor valve includes a housing having a plurality of passages extending laterally therein, a rotary valve having a first and a second valve chamber, said first valve chamber open at one end of said valve to the air under pressure of said pump, said second valve chamber open at the opposite end of said valve to atmosphere, said first and second valve chambers having valve ports opening successively to each of said lateral passages, one of said passages opening to atmosphere and the others of said passages for connection to inflatable units.

6. For use with inflatable units for removing ice from airfoil surfaces of an aircraft; a mechanism comprising a housing having a plurality of passages extending laterally therein, a rotary valve having a first and a second valve chamber, said first valve chamber open at one end of said valve, a rotary pump for supplying air under pressure to said first valve chamber through said one open end, said second valve chamber open at the opposite end of said valve to an air pressure outlet port, said first and second valve chambers having valve ports successively opening said first and second valve chambers to each of said lateral passages, one of said passages opening to atmosphere and the others of said passages for connection to said units, electric motor means for rotating said valve and pump, an energizing circuit for said motor means, a main control switch for said energizing circuit, an auxiliary switch maintaining said circuit closed, and means for actuating said auxiliary switch so as to open said circuit upon the port of said first valve chamber registering with said one passage opening to atmosphere.

7. For use with inflatable units for removing ice from airfoil surfaces of an aircraft; a mechanism comprising in a unitary housing, power means, an air pump, means connecting said power means to said air pump, said housing having a plurality of air passages, a valve arranged in cooperative relation between said pump and passages for selectively distributing air under pressure of said pump to said passages, a spring operated escapement mechanism for actuating said valve, and means operably connecting said power means to said escapement mechanism for actuating said valve through said spring.

8. For use with inflatable units for removing ice from airfoil surfaces of an aircraft; a mechanism comprising in a unitary housing, an electric motor means, an air pump, means connecting said electric motor means to said air pump, said housing having a plurality of air passages, a valve arranged in cooperative relation between said pump and passages for selectively distributing air under pressure of said pump to said passages, an escapement mechanism including a spring for periodically actuating said valve, and means operably connecting said electric motor means to said escapement mechanism for actuating said valve through said spring.

9. For use with inflatable units for removing ice from airfoil surfaces of an aircraft; a mechanism comprising in a unitary housing, an electric motor means, an air pump, first means connecting said electric motor means to said air pump, said housing having a plurality of air passages, a valve arranged in cooperative relation between said pump and passages for selectively distributing air under pressure of said pump to said passages, second means operably connecting said electric motor means to said valve, switch means for maintaining a circuit for energizing said motor means, and means operated by said second connecting means for actuating said switch means to a position for opening said circuit at a predetermined position of said valve.

ROBERT MICHAEL FLANAGAN.

REFERENCES CITED

The following references are of record in the file of this patent:

UNITED STATES PATENTS

| Number | Name | Date |
|---|---|---|
| 1,104,474 | Buerger | July 21, 1914 |
| 1,173,708 | Chance | Feb. 29, 1916 |
| 1,516,979 | Nilson | Nov. 25, 1924 |
| 1,525,839 | Webb | Feb. 10, 1925 |
| 1,555,287 | Howe | Sept. 29, 1925 |
| 1,760,902 | Grattan | June 3, 1930 |
| 1,769,153 | Meyer | July 1, 1930 |
| 1,891,101 | LeCount | Dec. 13, 1932 |
| 2,249,339 | Wells | July 15, 1941 |
| 2,420,137 | Hunter | May 6, 1947 |